May 1, 1923.

G. A. DUFRESNE

RESILIENT WHEEL

Filed June 13, 1921

1,453,786

Inventor:
Georges Arthur Dufresne
By
William C. Sinton
Attorney

Patented May 1, 1923.

1,453,786

UNITED STATES PATENT OFFICE.

GEORGES ARTHUR DUFRESNE, OF TROIS RIVIERES, QUEBEC, CANADA.

RESILIENT WHEEL.

Application filed June 13, 1921. Serial No. 477,224.

*To all whom it may concern:*

Be it known that I, GEORGES ARTHUR DUFRESNE, a subject of the King of Great Britain, residing at Trois Rivieres, in the Province of Quebec, Canada, have invented certain new and useful Improvements in Resilient Wheels; and I do hereby declare that the following is a full, clear, and exact description of the invention, such as will enable others skilled in the art to which it appertains to make and use the same.

The present invention relates to new and useful improvements in resilient wheels.

The primary object of the invention is the provision of a resilient wheel so arranged that the outer rim will be yieldingly connected to the hub in order to permit the use of solid tires with the elimination of the usual shock to the vehicle when such solid tires are employed.

Another object of the invention is the provision of a resilient wheel so arranged as to permit of the elimination of the use of customary resilient tires and affording a spring connection which will offer all of the desired resiliency required in wheels of this character.

Another object of the invention is the provision of a wheel including a hub with an inner rim secured rigidly thereto and an outer rim spaced from the inner rim and resiliently connected thereto, whereby sufficient resiliency will be provided, thus permitting the elimination of the usual pneumatic tires.

A still further object of the invention is the provision of a resilient wheel such as above referred to which will be comparatively simple and inexpensive to manufacture, reliable and efficient in use, and readily operated.

With the above and other objects in view, the present invention resides in the novel features of construction, formation, combination and arrangement of parts to be hereinafter more fully described, claimed and illustrated in the accompanying drawing forming a part of the present application; and in which—

Figure 1:
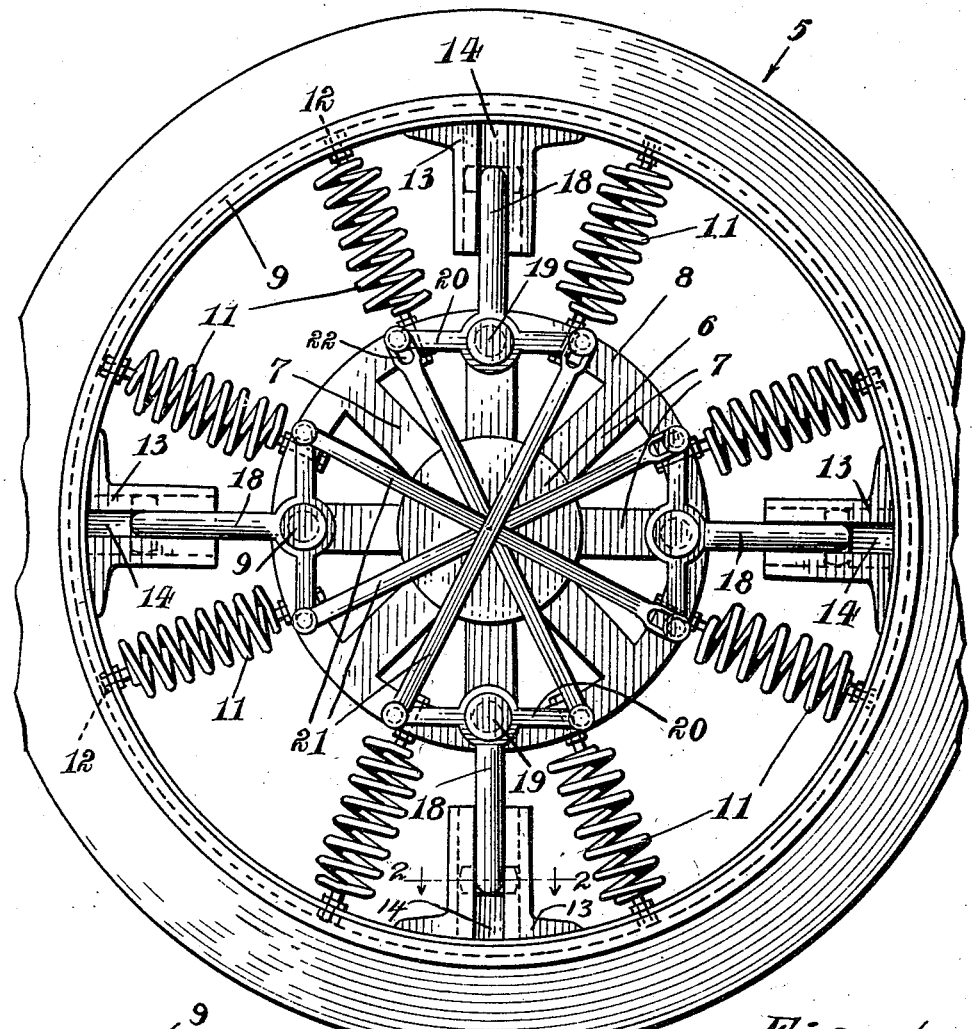
Figure 1 is a side view of a wheel constructed in accordance with the present invention.

Referring now to the accompanying drawing by corresponding characters of reference throughout the several views, the numeral 5 designates in general my improved wheel, which comprises a hub portion 6 which is rigidly secured to the rim by means of spokes 7 and an inner rim 8 which is formed concentrically with the said hub portion 6.

An outer rim is shown at 9 and may be of any desired construction to receive and support a tire which may be of hard rubber or other similar material.

The rims 8 and 9 are suitably connected by springs 11, the opposite ends of which are threaded to pass through the said rims in which position they are held by nuts 12.

Figures 2, 3:
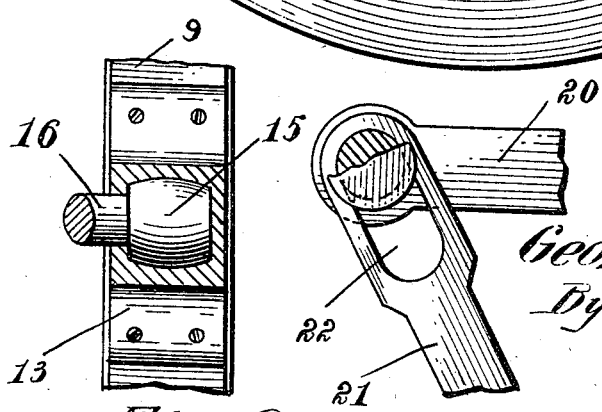
Figure 2 is a detail enlarged sectional view taken on the line 2—2 of Figure 1.
Figure 3 is a detail view showing the method of connecting the links.

A plurality of equi-spaced guide members 13 are rigidly secured about the inner surface of the rim 9 and are formed with narrow-top longitudinally extending channels or grooves 14 slidably receiving therein laterally disposed heads 15 which, as will be apparent from Figure 2, are circular in cross section and have convex walls. These heads 15 are carried upon the outer face of connecting rods 18 which, as indicated by Figure 2, have right angularly disposed portions 16 formed thereon, and upon the free ends of said portions 16 the heads 15 are arranged. The inner or remaining ends of the connecting rods 18 are pivoted, as at 19, to the inner rim 8, the pivot pins serving to support rocker arms 20 which are secured to the rods 18. The rocker arms are loosely and pivotally connected with the opposite ends of links 21. These links 21 are disposed diametrically of the inner rim and at certain of their ends are pivoted to the adjacent ends of the rocker arms, while at their opposite ends they are slotted, as at 22, and loosely and pivotally connected to the adjacent ends of the diametrically opposite rockers 20. The connections of the links 21 with the rocker arms occur directly adjacent the inner ends of the springs 11 and thus, it will be understood that stress upon the wheel will be directed to and absorbed by the diametrically arranged pairs of springs 11 through their respective connecting links 21.

Referring to Figure 1 for the operation of the device, let it be assumed that a stress upon the wheel is exerted at the lowermost portion thereof. The lowermost springs 11 will tend to compress, whereupon the entire inner rim 8 is forced upwardly, the uppermost head 15 being guided in the rigid channel member 13. This upward movement of the rim causes a turning of the side rocker arms 20 about their respective pivot points, since the side rods 18 cannot turn because of their retention in the guide members. Each rocker arm end transmits movement in the opposite direction to the diametrically opposite rocker arm end, by means of the respective links 21. It will thus be seen that a shock received at the lower portion of the wheel is first transmitted to the upper part, as the consequence of which the side rocker arms are actuated and divide their resultant motion between them. In this manner, vibration throughout the wheel structure will be reduced to a minimum, and only those diametrically arranged springs 11 in the direct path of stress applied to the wheel from its tread portion will be affected.

From the foregoing description taken in connection with the accompanying drawing it will be manifest that a resilient wheel is provided which will fulfill all of the necessary requirements of such a device and it should be further understood in this connection that various minor changes in the specific details of construction can be resorted to within the scope of the appended claims, without departing from the spirit or sacrificing any of the advantages of the invention.

Having thus fully described the invention, what I claim as new and desire to secure by Letters Patent is:

1. The herein described resilient wheel comprising an inner and an outer rim, springs connecting the inner rim and the outer rim, bars having heads extending from the inner rim and pivotally connected thereto, guides carried by the outer rim for receiving the heads of the bars, rocker arms carried by the bars, and links connecting the rocker arms upon opposite sides of the inner rim, one end of each of said links being slotted, substantially as and for the purposes set forth.

2. The herein described resilient wheel, comprising an inner and an outer rim, a hub formed upon the inner rim, a tire carried by the outer rim, springs connecting said rims, bars pivoted to the inner rim and extending outwardly therefrom, guides secured to the outer rim, said guides having channels formed therein, heads formed upon the bars slidable within the channels, rocker arms upon the inner ends of said bars, and links connecting the rocker arms upon opposite sides of the inner rim, substantially as and for the purposes set forth.

3. The herein described resilient wheel comprising an inner and an outer rim, springs connecting the inner rim and the outer rim, bars extending from the inner rim and pivotally connected thereto, guides carried by the outer rim for receiving the bars, rocker arms carried by the bars and links connecting the rocker arms upon opposite sides of the inner rim, said links extending diametrically across said inner rim, substantially as and for the purposes set forth.

In witness whereof I have hereunto set my hand.

GEORGES ARTHUR DUFRESNE.